(12) United States Patent
Sato et al.

(10) Patent No.: US 9,017,084 B2
(45) Date of Patent: Apr. 28, 2015

(54) MEMORY CARD CONNECTOR

(71) Applicant: Honda Tsushin Kogyo Co., Ltd., Tokyo (JP)

(72) Inventors: Takeshi Sato, Tokyo (JP); Kenichi Takahashi, Tokyo (JP)

(73) Assignee: Honda Tsushin Kogyo Co., Ltd., Tokyo (JP)

( * ) Notice: Subject to any disclaimer, the term of this patent is extended or adjusted under 35 U.S.C. 154(b) by 22 days.

(21) Appl. No.: 14/100,495

(22) Filed: Dec. 9, 2013

(65) Prior Publication Data

US 2014/0213083 A1 Jul. 31, 2014

(30) Foreign Application Priority Data

Jan. 28, 2013 (JP) ................................. 2013-013053

(51) Int. Cl.
*H01R 27/00* (2006.01)
*H01R 13/64* (2006.01)
*H01R 13/24* (2006.01)
*G06K 7/00* (2006.01)

(52) U.S. Cl.
CPC ............ *H01R 13/64* (2013.01); *H01R 13/2442* (2013.01); *H01R 13/2464* (2013.01); *G06K 7/0021* (2013.01)

(58) Field of Classification Search
CPC .. G06K 7/0021; H01R 27/00; H01R 13/2442; H01R 12/57
See application file for complete search history.

(56) References Cited

U.S. PATENT DOCUMENTS

| | | | | | |
|---|---|---|---|---|---|
| 5,013,255 | A | * | 5/1991 | Juret et al. | 439/260 |
| 7,086,906 | B1 | * | 8/2006 | Ting | 439/630 |
| 7,271,475 | B2 | * | 9/2007 | Wada et al. | 257/679 |
| 7,862,381 | B2 | * | 1/2011 | Miller | 439/630 |
| 7,909,611 | B2 | * | 3/2011 | Miller | 439/60 |
| 2004/0106326 | A1 | * | 6/2004 | Hsieh | 439/630 |
| 2013/0005190 | A1 | * | 1/2013 | Blanchfield et al. | 439/630 |

FOREIGN PATENT DOCUMENTS

JP 2012-018863 1/2012

* cited by examiner

*Primary Examiner* — Gary Paumen
(74) *Attorney, Agent, or Firm* — Wenderoth, Lind & Ponack, L.L.P.

(57) ABSTRACT

Disclosed a memory card connector including a case body having a memory card storage portion which allows insertion of either a memory card having single row of signal pad portions and a memory card having front and rear rows of the pad portions, the case body having rear-row signal contacts coming into abutment with the rear-row signal pad portions of the memory card and contacts that establish electric contact by coming into abutment with the single row of signal pad portions or the front-row signal pad portions. Each the rear-row signal contact has two contact ends to abut only with the case portion of the card when the card having single row signal pad portions is stored in the storage portion, and to abut only with the rear-row signal pad portion of the card when the card having the two rows of pad portions is stored in the storage portion.

2 Claims, 5 Drawing Sheets

MEMORY CARD CONNECTOR

BACKGROUND OF THE INVENTION

1. Field of the Invention

The present invention relates to a memory card connector for storing a memory card to connect the memory card to a record reading device.

2. Prior Art

In the prior art, memory cards such as SD cards (registered trademark) or MS cards (registered trademark) include a memory card 4 having single row of pad portions 4a for signals and a new memory card 5 having front-row signal pad portions 5a and a rear-row signal pad portions 5d arranged in parallel in two rows in the front and rear as illustrated in FIGS. 4A and 4B.

A memory card connector 10 configured to store either the above-described new and old memory cards 4 and 5 in a card storage portion without problem includes, as illustrated in FIGS. 4C and 5A, a case 10a having a memory card storage portion and a shell formed of a synthetic resin or a metal, a plurality of rear-row signal contacts 11 whose end portions abut against and electrically connected to rear-row signal pad portions 5d of the memory card 5 and which are partly secured to the case 10a, and signal contacts 3 abutting against and electrically connected to pad portions 4a or the front-row signal pad portions 5a of the memory card 4 or 5 to be stored in the memory card storage portion (JP-A-2012-18863). In the memory cards 4 and 5, a thickness t1 of the pad portion is thinner than a thickness t2 of the case portion by forming a step from a bottom surface of the case portion, as illustrated in FIGS. 5B and 5C.

For the memory card 4 inserted into the memory card storage portion, the rear-row signal contact 11 formed as illustrated in FIG. 6 slides in pressure contact with the pad portion 4a and the case portion 4b respectively as illustrated in FIGS. 7 and 8 when the memory card 4 is inserted into the storage portion. In contrast, when the memory card 5 is inserted into the memory card storage portion, the rear-row signal contact 11 slides in pressure contact with the front-row signal pad portion 5a and the rear-row signal pad portion 5d of the memory card 5.

The distal end portion 11c of the rear-row signal contact 11 is formed to have a single curved surface by bending a metallic foil plate as illustrated in FIGS. 6 to 8. Therefore, the contact position of the contact end 11a for contact with the rear-row signal pad portion that comes into contact with the rear-row signal pad portion 5d and the contact position of the contact end 11b for contact with the case portion of the memory card 4, which depends on the bending angle of the rear-row signal contacts 11, are different. However, as illustrated in FIG. 7 and FIG. 8, the contact positions of the contact end 11a for contact with the rear-row signal pad portion and the contact end 11b for contact with the case portion of the distal end portions 11c are in quite proximity with each other in the same curved surface.

Therefore, although the memory card connector 10 is a connector compatible with both of the memory cards 4 and 5, when the memory card 4 having single row of the pad portions 4a is inserted in and pulled out repeatedly, shavings of the case portion 4b of the memory card 4 may be adhered to the contact ends 11a for contact with the rear-row signal pad portions of the rear-row signal contacts 11, and plated layers near the contact ends 11b for contact with the case portion is subject to wear.

The shavings of the contact ends 11b for contact with the case portion are conveyed by the distal end portion 11c of the rear-row signal contact 11 to the contact end 11a for contact with the rear-row signal pad portion and are adhered thereto, which causes lowering of contact reliability between the rear-row signal pad portion 5d and the rear-row signal contact 11. The memory card connector of the invention is proposed in order to solve the problems described above.

SUMMARY OF THE INVENTION

In order to solve the above-described problem, there is provided a memory card connector including: a case body having an opening portion which allows insertion of both of a memory card having single row of signal pad portions and a memory card having two, that is, front and rear rows of the pad portions including front-row signal pad portions and rear-row signal pad portions and a memory card storage portion, the case body having rear-row signal contacts coming into abutment with the rear-row signal pad portions of the memory card and contacts that establish electric contact by coming into abutment with the single row of signal pad portions or the front-row signal pad portions, wherein a distal end of each of the rear-row signal contacts is formed with two contact ends including a contact end for contact with a case portion, which is a projection coming into abutment only with the case portion of the memory card when the memory card having the single row signal pad portions is stored in a storage portion, and a contact end for contact with the rear-row signal pad portion, which is projection coming into abutment only with the rear-row signal pad portion of the memory card when the memory card having the two rows of pad portions is stored in the storage portion.

Preferably, the contact end for contact with the case portion and the contact end for contact with the rear-row signal pad portion each have a curved shape at least at an upper portion of a transverse section, and the both contact ends are continuously connected with a trough interposed therebetween.

According to the memory card connector, since the contact portion at the distal end portion of the rear-row signal contact is divided into two parts including a contact end for contact with the case portion as a projecting portion configured to come into contact with the case portion when the memory card having the single row of signal pad portions is inserted and a contact end for contact with the rear-row signal pad portion as a projecting portion coming into contact with the rear-row signal pad portion when the memory card having two rows of the pad portions is inserted. Therefore, the shavings of the case portion are not moved from the projecting portion coming into contact with the case portion to the projecting portion coming into contact with the rear-row signal pad portion and are not adhered thereto. Therefore, the invention achieves a superior advantage of an improvement in contact reliability.

The contact end for contact with the rear-row signal pad portion, which is a projecting end coming into contact with the rear-row signal pad portion of the memory card having the two rows of the pad portions does not come into contact with the case portion of the memory card having the single row of the pad portions. Therefore, the invention achieves superior advantages that wearing of plating of the contact end portion with the rear-row signal pad portion, which is a projection to come into contact with the rear-row signal pad portion, may be minimized.

DETAILED DESCRIPTION OF THE PREFERRED EMBODIMENTS

Figure 1A:
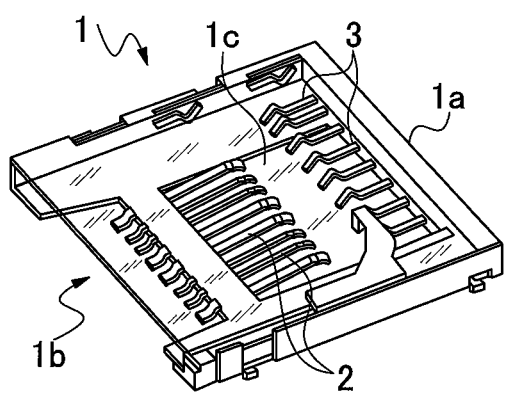
FIG. 1A is a top, front, and right side perspective view as seen through of a memory card connector of an embodiment of the invention.
Figure 1B:
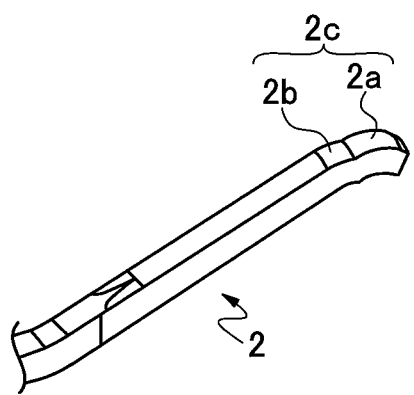
FIG. 1B is a partial perspective view illustrating a rear-row signal contact of the memory card connector.

As illustrated in FIGS. 1A and 1B, a memory card connector 1 of the invention includes rear-row signal contacts 2 each including two curved shaped projections, that is, a contact end 2a for contact with the rear-row signal pad portion and a contact end 2b for contact with the case portion at a contact point at a distal end thereof so as to have two contact points on different curves apart from each other in the fore-and-aft direction.

EXAMPLE

The memory card connector 1 of an embodiment of the invention includes a case body 1a having an opening portion 1b for inserting a memory card 4, or 5, and a storage portion 1c as illustrated in FIGS. 1A and 1B.

The case body 1a includes the rear-row signal contacts 2 configured to come into sliding contact with a case portion 4b of the memory card 4 when the memory card to be stored in the storage portion 1c is the memory card 4 having single row of signal pad portions 4a and come into sliding contact with a rear-row signal pad portion 5d of the memory card when the memory card is the memory card 5 having two rows of the pad portions, that is, a front-row signal pad portion 5a and rear-row signal pad portions 5d, and a front-row signal contacts 3 configured to come into electrical contact with the either one of the pad portion 4a or 5a of the memory card 4 or 5.

Figure 2:
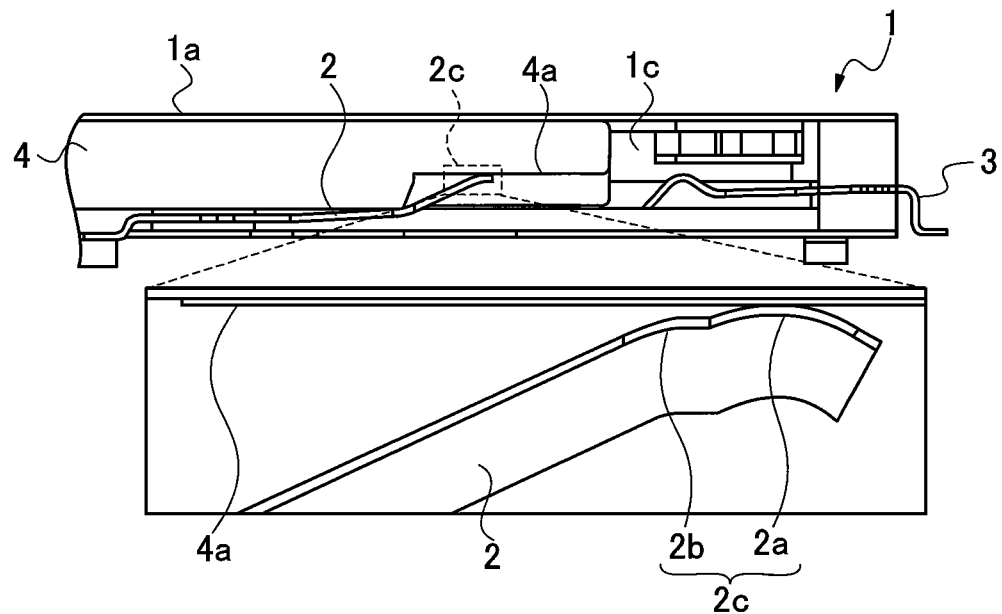
FIG. 2 illustrates a vertical cross sectional view of a state in the course of storing a memory card having single row of the pad portions into the memory card connector and a partly enlarged cross sectional view thereof.
Figure 3:
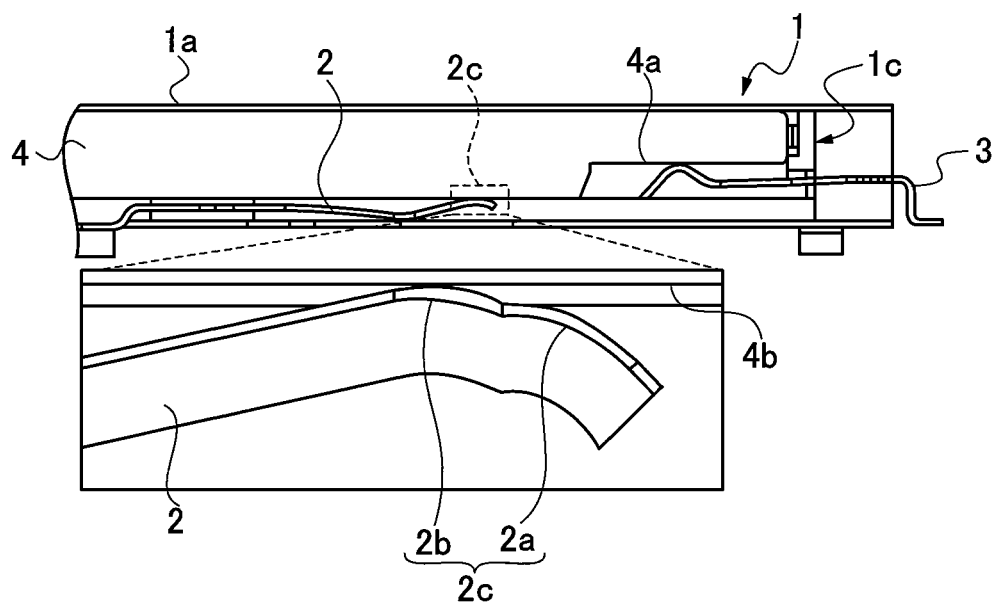
FIG. 3 illustrates a vertical cross sectional view of a state in which the memory card having single row of the pad portions is stored in the memory card connector and a partially enlarged cross sectional view thereof.
Figure 4A:
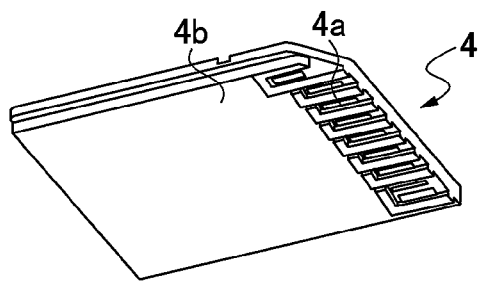
FIG. 4A is a bottom side perspective view of the memory card having single row of signal pad portions.
Figure 4B:
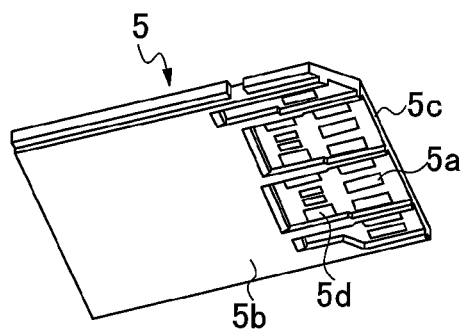
FIG. 4B is a bottom side perspective view of the memory card having two, front and rear rows of signal pad portions.
Figure 4C:
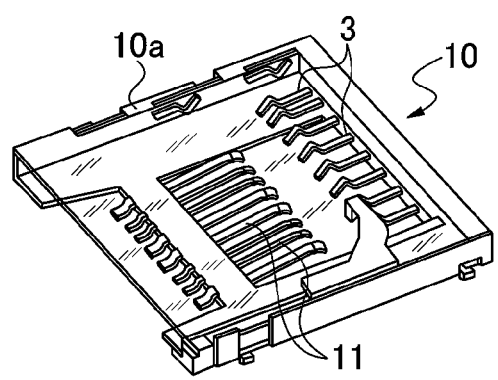
FIG. 4C is a top, front, and right side perspective view of the memory card connector of the prior art.

The distal end portion 2c of the rear-row signal contact 2 is formed with two projections which come into abutment separately with the pad portion 4a and the case portion 4b when the memory card 4 is stored in the storage portion 1c, that is, the contact end 2a for contact with the rear-row signal pad portion and the contact end 2b for contact with the case portion as illustrated in FIG. 2 to FIG. 3.

In the rear-row signal contact 2, when the memory card 5 is stored in the storage portion 1c, the contact end 2a for contact with the rear-row signal pad portion comes into abutment with the front-row signal pad portion 5a and the rear-row signal pad portion 5d, and the contact end 2b for contact with the case portion does not come into abutment with any of the pad portions of the memory card 5.

As illustrated in FIG. 1B, the contact end 2a for contact with the rear-row signal pad portion and the contact end 2b for contact with the case portion, which are separate projections coming into abutment with the pad portion 4a and the case portion 4b of the memory card 4 separately are each formed into a curved projection, and root portions thereof are connected to each other with a trough portion interposed therebetween. Examples of lateral cross section of the both contact ends 2a and 2b include a flat shape, an arcuate shape, a semi-circular shape, and a projecting shape.

Positions of apexes of the projecting portions of the contact end 2a for contact with the rear-row signal pad portion and the contact end 2b for contact with the case portion of the rear-row signal contact 2 are apart from each other in the direction of insertion and pulling out of the memory card 4 or 5, that is, in the fore-and-aft direction by a predetermined distance.

According to the memory card connector 1 in this configuration, for example, when the memory card 4 is inserted from the opening portion 1b toward the storage portion 1c as illustrated in FIG. 2 to FIG. 3, the contact end 2a for contact with the rear-row signal pad portion of the rear-row signal contact 2 firstly comes into resilient contact with the pad portion 4a of the memory card 4.

Figure 5A:
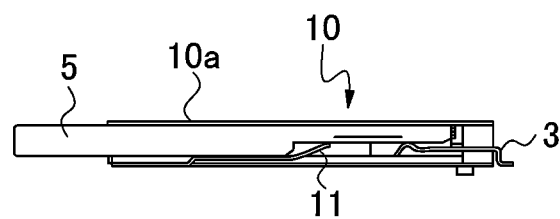
FIG. 5A is a vertical cross sectional view of a state in which the memory card having two rows of signal pad portions is stored in a storage portion of the memory card connector of the prior art.
Figure 5B:
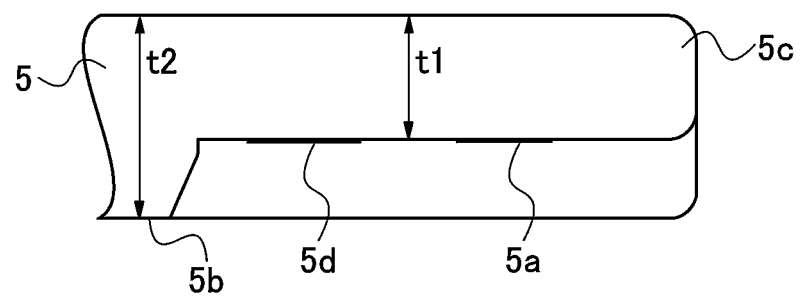
FIG. 5B is a side view illustrating the memory card partially in an enlarged scale.
Figure 5C:
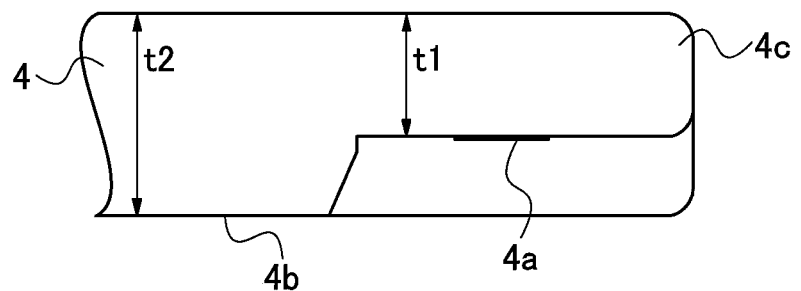
FIG. 5C is a side view of the memory card having single row of signal pad portions partially in an enlarged scale.
Figure 6:
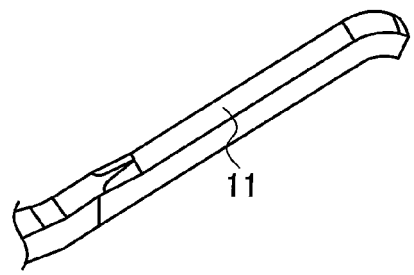
FIG. 6 is a partial perspective view illustrating a rear-row signal contact of the memory card connector of the prior art.
Figure 7:
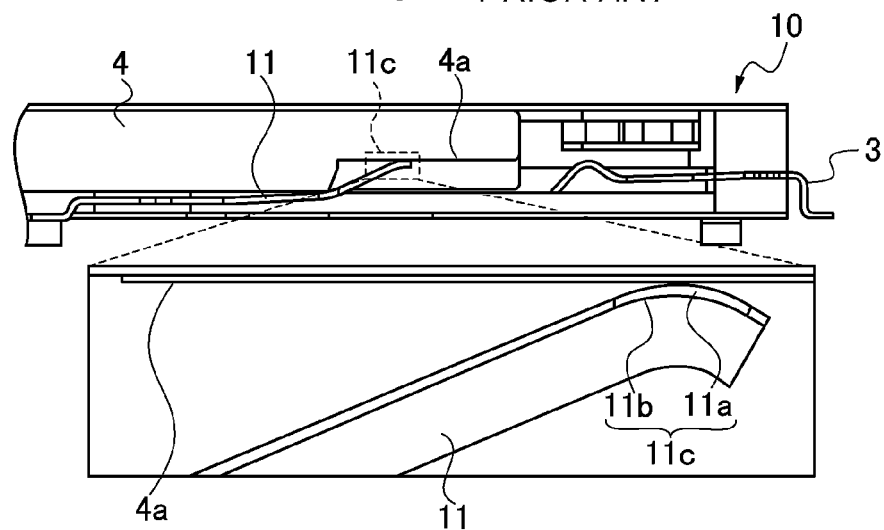
FIG. 7 illustrates an explanatory cross sectional view of a state in the course of storing a memory card having single row of signal pad portions into the memory card connector and a partially enlarged cross sectional view thereof of the prior art.
Figure 8:
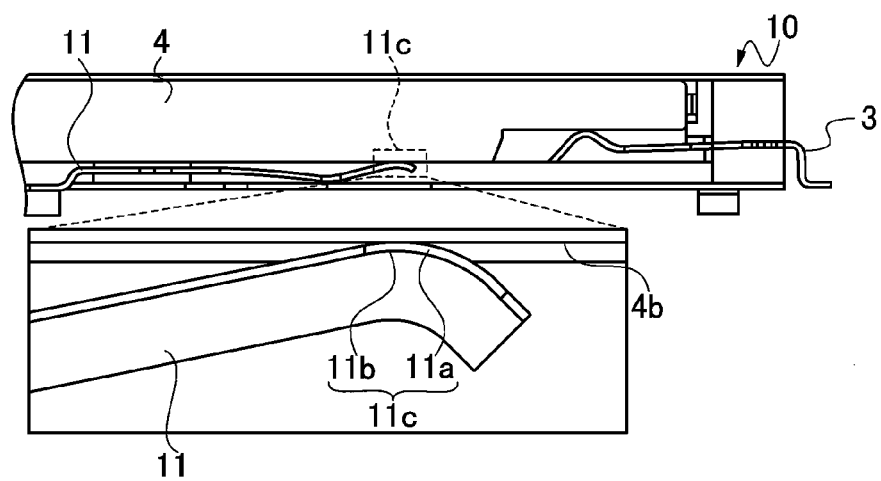
FIG. 8 illustrates an explanatory cross-sectional view of a state in which the memory card having single row of signal pad portions is stored in the memory card connector and a partially enlarged cross sectional view thereof of the prior art.

Here, the thickness t1 of the pad portion 4a having such a shape that a lower end side is cut off is smaller than the thickness t2 of the case portion as illustrated in FIG. 5C, so that the rising angle of the distal end portion 2c of the rear-row signal contact 2 is increased, and the contact end 2a for contact with the rear-row signal pad portion of the distal end portion 2c comes into abutment with the pad portion 4a.

When the memory card 4 is inserted from the state illustrated in FIG. 2 further into the back of the storage portion 1c, the distal end portion 2c of the rear-row signal contact 2 is held by the case portion 4b of the memory card 4 and hence comes into abutment thereto at a small rising angle, whereby the contact end 2b for contact with the case portion of the rear-row signal contact 2 comes into abutment with the case portion 4b.

As illustrated in FIG. 3, when the memory card 4 is completely stored in the storage portion 1c, a distal end portion of the front-row signal contact 3 of the memory card connector 1 comes into abutment with the pad portion 4a of the memory card 4, and the contact end 2b for contact with the case portion of the rear-row signal contact 2 comes into abutment with the case portion 4b. In other words, in a state in which the storage is completed, the contact end 2a for contact with the rear-row signal pad portion does not come into contact with the case portion 4b of the memory card 4.

In contrast, the contact end 2b for contact with the case portion does not come into contact with the pad portion 4a of the memory card 4. Therefore, shavings of the case portion 4b are not adhered to the pad portion 4a together with the contact end 2b for contact with the case portion. In the same manner, shavings of the case portion 5b are not adhered to the front-row signal pad portion 5a or the 5d of the memory card 5 together with the contact end 2b for contact with the case portion. In addition, since the contact end 2b for contact with the case portion is not in contact with the case portion 4b or the case portion 5b, separation of plating of the contact end 2a for contact with rear-row signal pad portion does not occur.

When pulling out the memory card 4 from the storage portion 1c of the memory card connector 1, even though the distal end portion 2c of the rear-row signal contact 2 rises from a posture at a small rising angle as illustrated in FIG. 2, the contact end 2b for contact with the case portion does not come into abutment with the pad portion 4a, and only the contact end 2a for contact with rear-row signal pad portion comes into abutment with the pad portion 4a.

In this manner, since the contact end 2b for contact with the case portion of the rear-row signal contact 2 does not come into abutment with the pad portions 4a and 5a and the rear-row signal pad portion 5d in the inserting and pulling-out operation of the memory card 4 or 5 with respect to the storage portion 1c, the contact reliability is improved.

From the configuration described above, problem of adhesion of dust or the like with respect to the pad portions 4a and 5a and the rear-row signal pad portion 5d caused by the rear-row signal contact 2 does not occur in the memory card connector 1 and the memory cards 4 and 5. Consequently, electric contact of the terminal of the front-row signal contact 3 with respect to the pad portion 4a and the front-row signal pad portion 5a, and electric contact between the rear-row signal contact 2 and the rear-row signal pad portion 5d are desirably and reliably maintained.

INDUSTRIAL APPLICABILITY

The memory card connector of the present invention is widely applicable for a structure of an electrical contact portion between the terminal portion of the contact and a pad portion of the memory card or the printed board.

What is claimed is:

1. A memory card connector comprising:
a case body having an opening portion which allows insertion of both of a memory card having single row of signal pad portions and a memory card having two, that is, front and rear rows of the pad portions including front-row signal pad portions and rear-row signal pad portions and a memory card storage portion, the case body having rear-row signal contacts coming into abutment with the rear-row signal pad portions of the memory card and contacts that establish electric contact by coming into abutment with the single row of signal pad portions or the front-row signal pad portions,
wherein a distal end of each of the rear-row signal contacts is formed with two contact ends including
a contact end for contact with a case portion, which is a projection coming into abutment only with the case portion of the memory card when the memory card having the single row signal pad portions is stored in a storage portion, and
a contact end for contact with the rear-row signal pad portion, which is a projection coming into abutment only with the rear-row signal pad portion of the memory card when the memory card having the two rows of pad portions is stored in the storage portion.

2. The memory card connector according to claim 1, wherein the contact end for contact with the case portion and the contact end for contact with the rear-row signal pad portion each have a curved shape at least at an upper portion of a transverse section, and the both contact ends are continuously connected with a trough interposed therebetween.

* * * * *